United States Patent [19]

Stemmer

[11] Patent Number: 5,571,300
[45] Date of Patent: Nov. 5, 1996

[54] FRAME AND PAD FILTER SYSTEM

[75] Inventor: Michael J. Stemmer, Collierville, Tenn.

[73] Assignee: Air Kontrol, Inc., Batesville, Miss.

[21] Appl. No.: 387,412

[22] Filed: Feb. 13, 1995

[51] Int. Cl.⁶ ................................................ B01D 35/30
[52] U.S. Cl. .................. 55/493; 55/495; 55/511; 55/DIG. 39; 96/17; 96/95
[58] Field of Search ............................ 55/495, 511, 493, 55/DIG. 39; 96/17, 95, 96

[56] References Cited

U.S. PATENT DOCUMENTS

| | | | |
|---|---|---|---|
| 2,057,568 | 10/1936 | Gerard | 55/481 |
| 2,789,663 | 4/1957 | Camp | 55/513 |
| 3,058,279 | 10/1962 | Metcalfe | 55/495 |
| 3,076,303 | 2/1963 | Durgeloh | 55/511 |
| 3,111,489 | 11/1963 | Getzin | 210/232 |
| 3,203,157 | 8/1965 | Watlington | 55/495 |
| 3,724,671 | 4/1973 | Tate | 210/484 |
| 3,774,377 | 11/1973 | Bishop | 55/493 |
| 3,778,985 | 12/1973 | Daigle et al. | 55/493 |
| 3,970,440 | 7/1976 | Copenhefer et al. | 55/501 |
| 4,438,057 | 3/1984 | Sundseth | 264/46.5 |
| 4,512,474 | 4/1985 | Harding | 206/461 |
| 4,737,174 | 4/1988 | Pontius | 55/316 |
| 4,739,883 | 4/1988 | Mohs et al. | 206/470 |
| 4,753,573 | 6/1988 | McKnight | 55/511 |
| 4,999,038 | 3/1991 | Lundberg | 55/491 |
| 5,273,564 | 12/1993 | Hill | 55/493 |
| 5,399,180 | 3/1995 | Kopp | 55/493 |
| 5,421,862 | 6/1995 | Davis | 95/273 |

*Primary Examiner*—Robert J. Warden
*Assistant Examiner*—Theresa T. Snider
*Attorney, Agent, or Firm*—Foley & Lardner

[57] ABSTRACT

A filter apparatus for a reusable one piece filter frame housing and a filter media for use in a forced air ventilating system. The one piece filter frame housing having integrally formed fasteners to releasably secure a replaceable filter media. The filter frame housing further having an "I" beam structure to enhance filter frame strength. The filter frame housing also having an electrostatic charge.

28 Claims, 5 Drawing Sheets

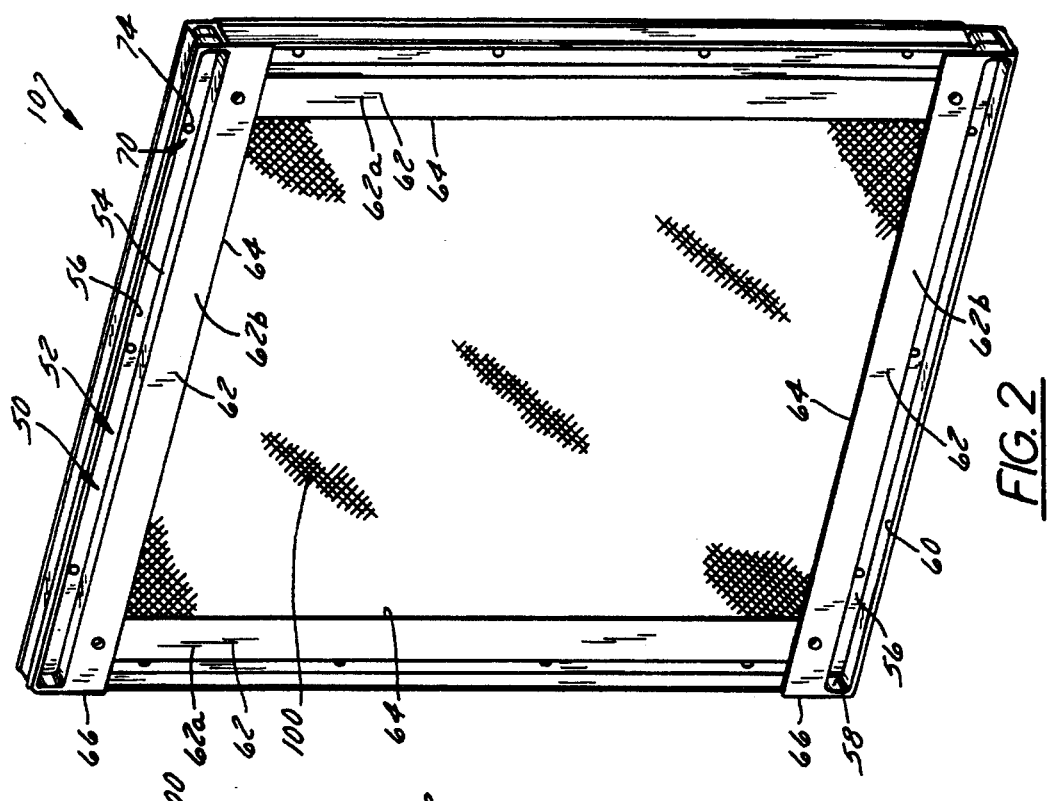
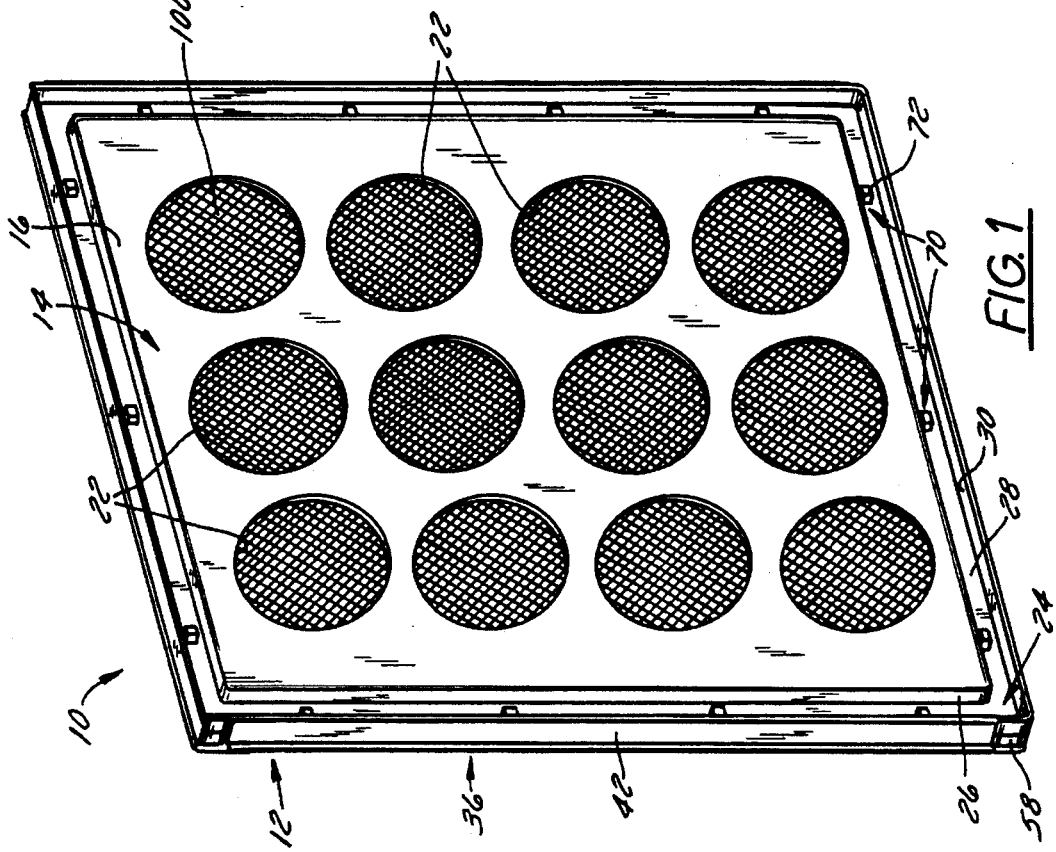

FRAME AND PAD FILTER SYSTEM

BACKGROUND OF THE INVENTION

This invention relates generally to a reusable filter frame and filter pad system and, in particular, to a filter housing typically used in domestic forced air heating and air conditioning systems.

In general, filters are utilized in forced air heating and air conditioning systems to remove particles from the air to be circulated. This is accomplished by use of an air filter placed within the forced air heating or air conditioning circulation system. The filter typically includes a filter media (e.g., filter pad) mounted in a filter frame housing.

After a period of use, the filter pad must be either cleaned or replaced. Many forced air systems are designed to use disposable air filter systems in which after a period of use the entire filter (e.g. filter pad and filter frame housing) is replaced.

Conventional disposable filter systems utilize a fiber board frame which is mechanically fastened together by use of an adhesive or staple to secure the filter pad within the frame housing. U.S. Pat. No. 3,970,440 to Copenhefer et al. discloses an example of this type of filter system in which the frame housing is constructed from a cut and scored blank of paperboard. The filter system utilizes an adhesive or an additional mechanical fastener to secure the frame housing structure. This type of filter system does not permit a user to replace the filter pad within the same frame housing.

Consequently, it would be desirable to have a filter system that would permit replacement of the filter pad in a lightweight filter housing having sufficient structural strength.

SUMMARY OF THE INVENTION

An embodiment of the apparatus for the filter frame and pad system includes a reusable filter frame housing and filter media useable in a forced air ventilating system. The filter frame housing includes a main member having a planar surface including a plurality of openings. The planar surface further includes a first pair of planar edges and a second pair of planar edges substantially perpendicular to the first pair of planar edges. The filter frame housing further includes a retaining flange and an integrally formed hinge connecting the retaining flange to the main member. The filter frame housing further includes an integrally formed fastener to releasably lock the filter media between the main member and the retaining flange.

In another embodiment, the filter frame and pad system includes a reusable filter frame housing and filter media useable in a forced air ventilating system. The filter frame housing includes a main member having a planar surface including a plurality of openings, and a first channel. The filter frame housing further includes a retaining flange having a retaining channel and a retaining extension. The filter frame housing also includes an integrally formed hinge connecting the retaining flange to the main member, and an integrally formed fastener to releasably secure the filter media between the main member and the retaining flange. The first channel, retaining channel and hinge form a structural "I" beam border when the filter frame housing is in the secured position.

In another embodiment, the filter frame and pad system includes a reusable filter frame housing useable for securing a filter media in a forced air ventilating system. The filter frame housing is manufactured from a polyethylene material. The filter frame housing having an electrostatic charge, whereby the electrostatic charge is transmitted to the filter media for increased filtering capability.

In one aspect of the present invention, a filter frame and pad system permits replacement of a filter pad in the filter housing.

DESCRIPTION OF THE DRAWING

FIG. 1 is a perspective view of the downstream side of the filter frame housing and pad assembly in the secured position.

FIG. 2 is a perspective view of the upstream side of the filter pad assembly illustrated in FIG. 1 in the secured position.

DETAILED DESCRIPTION OF THE PREFERRED EMBODIMENT

Figure 3:
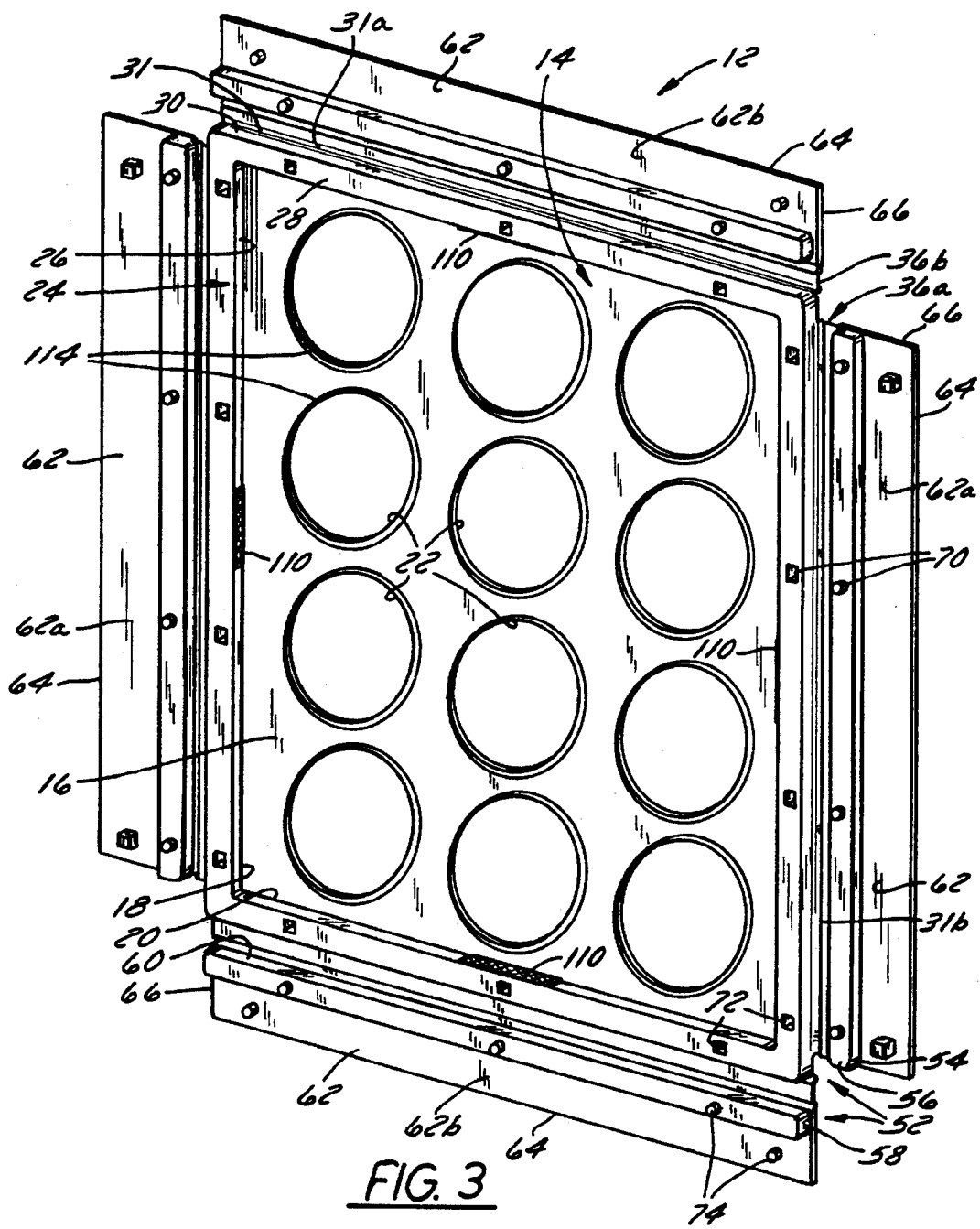
FIG. 3 is a perspective view of the upstream side of the filter frame housing illustrated in FIG. 1 in the open position.

Referring to FIGS. 1–3, a filter frame and pad apparatus 10 includes a one piece frame housing 12 and a filter media (e.g. filter pad) 100. Frame housing 12 is provided with a main member 14, a hinge 36, a retaining flange 50, and a fastener 70. FIGS. 1 and 2 illustrate frame housing 12 in the engaged position. FIG. 3 illustrates frame housing 12 in the open or unengaged position.

Figure 7:
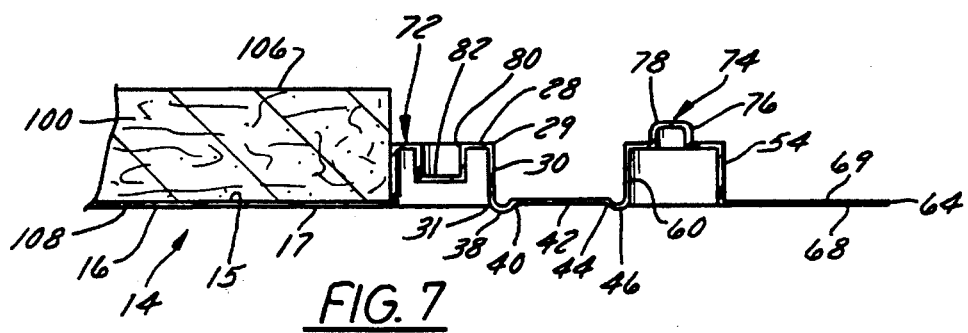
FIG. 7 is a cross sectional view of the filter frame housing for the assembly illustrated in FIG. 1 in the open position.

Main member 14 is provided with a planar surface 16 having a planar surface upstream side 15 and a planar surface downstream side 17 (see FIG. 7). Planar surface 16 having a plurality of openings 22. In the preferred embodiment a plurality of circular ribs 114 extend from planar surface upstream side 15 around openings 22. In this manner circular ribs 114 provide additional strength to planar surface 16. Planar surface 16 is bounded by a first pair of planar edges 18 and a second pair of planar edges 20. In the preferred embodiment, first pair of planar edges 18 and second pair of planar edges 20 are substantially perpendicular to one another creating a rectangular form for main member 14, with first pair of planar edges 18 having a length greater than second pair of planar edges 20.

Main member 14 is further provided with a first channel 24 having an inner wall 26, a top wall 28, and an outer wall 30 arranged in such a manner to form a U-shaped channel.

Figure 4:
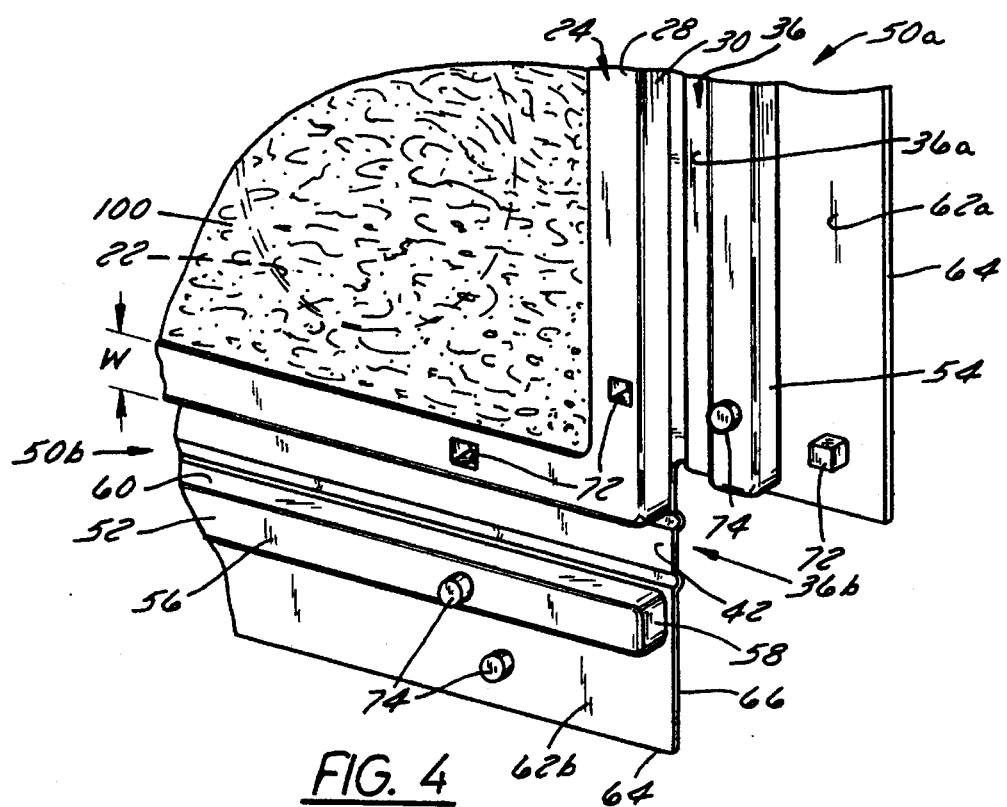
FIG. 4 is a fragmentary perspective view of the upstream side of a corner of the filter frame housing for the assembly illustrated in FIG. 1 in the open position.
Figure 5:
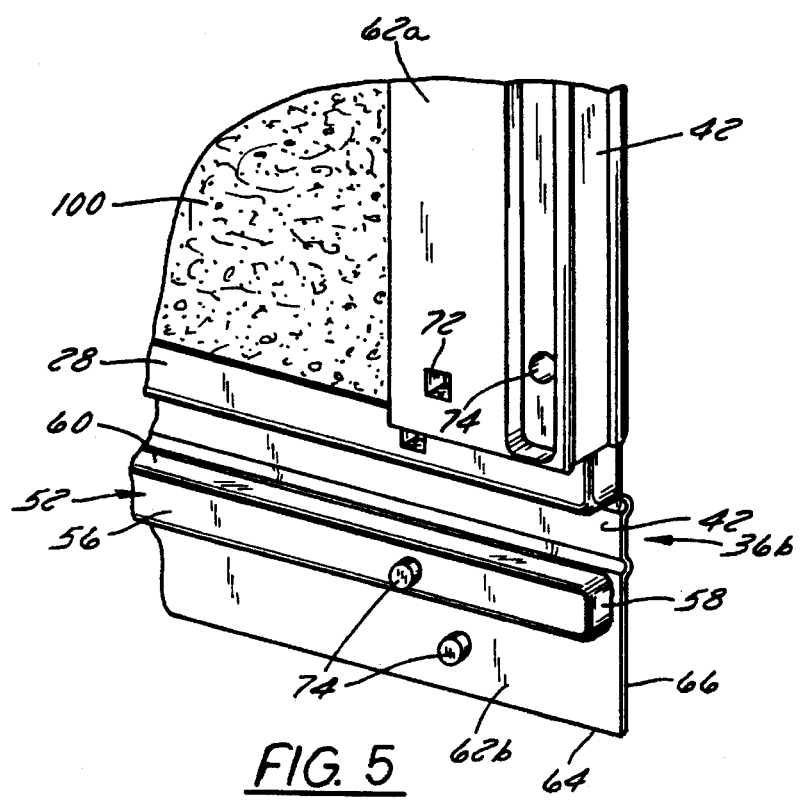
FIG. 5 is a fragmentary perspective view of the upstream side of a corner of the filter frame housing for the assembly illustrated in FIG. 1 with a first retaining flange in the engaged position and a second retaining flange in the open position.
Figure 6:
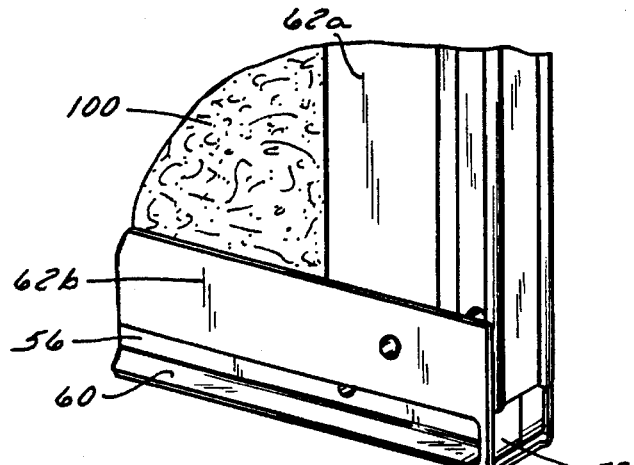
FIG. 6 is a fragmentary perspective view of the upstream side of a corner of the assembly illustrated in FIG. 1 with a second retaining flange overlapping the corner of a first retaining flange.

Inner wall 26 is integrally formed and extends essentially normal from upstream face 15 of planar surface 16 along first and second pair of planar edges 18, 20. Inner wall 26 may also extend from planar edges 18, 20 at an angle greater than 90 degrees for both strength and manufacturing considerations. Top wall 28 is substantially parallel to planar surface 16 and connects inner wall 26 and outer wall 30. Top wall 28 has a width W (see FIG. 4). Outer wall 30 is substantially parallel to inner wall 26. Outer wall 30 may also extend from top wall 28 at an angle greater than 90 degrees for strength and manufacturing considerations. In this manner, the distance between inner wall 26 and outer wall 30 increases as inner wall 26 and outer wall 30 extend away from top wall 28.

Outer wall 30 further includes a distal edge 31 located opposite a proximal edge 29 contiguously formed with top wall 28. Distal edge 31 further includes a first pair of distal edges 31a substantially parallel to the first pair of planar edges 18, and a second pair of distal edges 31b substantially parallel to the second pair of planar edges 20 (See FIG. 3). First pair of distal edges 31a have a length equal to the first pair of planar edges 18 plus two times the width W of top wall 28. Second pair of distal edges 31b have a length equal to the second pair of planar edges 20 plus two times the width W of top wall 28.

In an alternative embodiment, first channel 24 may have other configurations. First channel 24 may be a ridge integrally formed and extending normal to planar surface 16 where the ridge may be solid or have a box shaped form, however, other shapes and configurations are possible as well.

The preferred embodiment includes a first pair of integrally formed hinges 36a extending from first pair of distal edges 31a, and a second pair of integrally formed hinges 36b extending from second pair of distal edges 31b. First pair of hinges 36a have a length equal to the length of first pair of planar edges 18. Second pair of hinges 36b have a length equal to the length of second pair of distal edges 31b.

Each hinge 36 includes a bottom hinge flange 38 integrally formed and extending from distal edge 31 of outer wall 30. Hinge 36 further includes a first hinge wall 40, a side hinge wall 42, a second hinge wall 44, and an upper hinge flange 46. In the open position, bottom hinge flange 38, side hinge wall 42, and upper hinge flange 46 are all essentially parallel to planar surface 16. In the open position, first hinge wall 40 and second hinge wall 44 are essentially normal to planar surface 16. In an alternative embodiment, first hinge wall 40 may have an arcuate form as a transition from bottom hinge flange 38 to side hinge wall 42. Likewise, second hinge wall 44 may have an arcuate form as a transition from side hinge wall 42 to upper hinge flange 46.

Frame housing 12 is provided with a first pair of retaining flanges 50a and a second pair of retaining flanges 50b. First pair of retaining flanges 50a are integrally formed and pivotally attached to first pair of hinges 36a. Second pair of retaining flanges 50b are integrally formed and pivotally attached to second pair of hinges 36b. Each retaining flange 50 is provided with a retaining channel 52 and a retaining extension 62.

Retaining channel 52 includes an inner retaining wall 54, a bottom retaining wall 56, and an outer retaining wall 60 arranged in such a manner to form a U-shaped channel. Outer retaining wall 60 is integrally formed with hinge 36. Retaining channel 52 further includes a pair of integrally formed end caps 58 having an arcuate shape to form a continuous wall between inner retaining wall 54 and outer retaining wall 60.

Retaining extension 62 is integrally formed and extending essentially perpendicular from inner retaining wall 54. Retaining extension 62 includes an outer edge 64 and a pair of side edges 66. Retaining extension 62 further includes an extension upstream surface 68 and an extension downstream surface 69.

Figure 8:
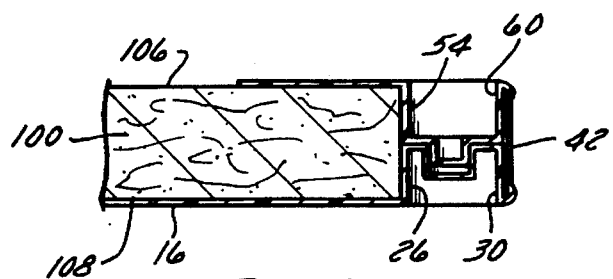
FIG. 8 is a cross sectional view of a fastener for the assembly illustrated in FIG. 1 in the engaged position.
Figure 9:
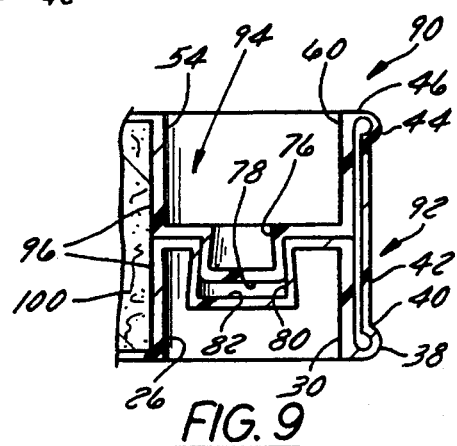
FIG. 9 is a more detailed cross sectional view of the fastener illustrated in FIG. 8 in the engaged position.
Figure 10:
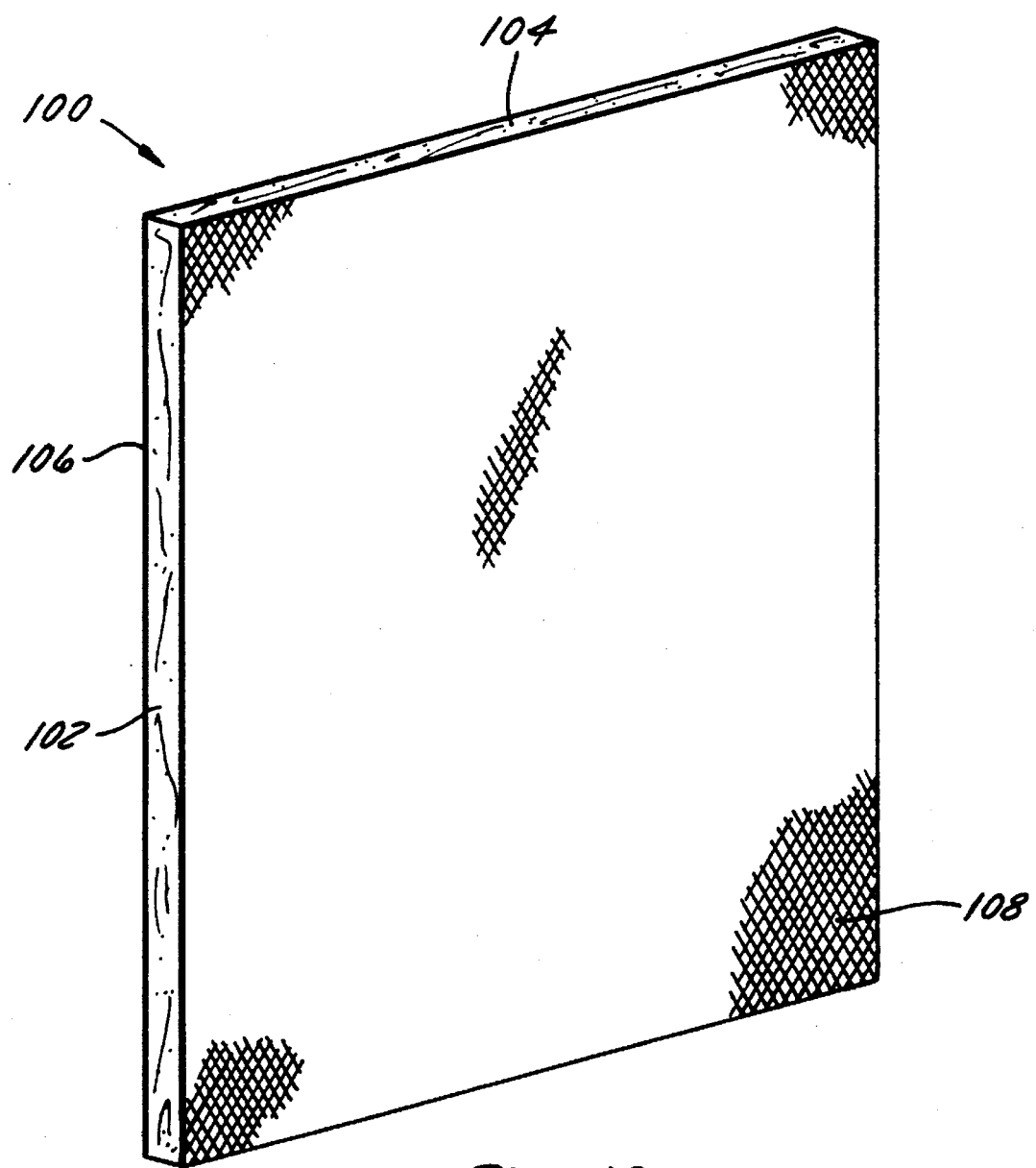
FIG. 10 is a perspective view of the upstream side of the filter pad.

In one embodiment, fastener 70 includes a plurality of recesses 72 integrally formed in top wall 28 of first channel 24 releasably engaging in an interference fit a plurality of protrusions 74 integrally formed in bottom retaining channel wall 56 (see FIG. 8). FIGS. 1 and 2 illustrates four pairs of protrusions 74 and recesses 72 releasably engaging retaining flange 50a to main member 14, and three pairs of protrusions 74 and recesses 72 releasably engaging retaining flange 50b to main member 14. It is possible to increase or decrease the number of fasteners 70. In the preferred embodiment an additional four fasteners 70 are located on retaining extensions 62a, 62b, such that protrusions 74 are integrally formed on retaining extensions 62b and recesses 72 are integrally formed on retaining extensions 62a. Alternatively, frame housing 12 maybe configured with less or more fasteners 70 or recesses 72 or protrusions 74. In an alternative embodiment, a single protrusion 74 and recess 72 may be utilized to releasably engage retaining flange 50 with main member 14.

In the preferred embodiment, protrusion 74 includes a cylindrical body 76 and a top end 78, while recess 72 includes a square shaped wall 80 and a bottom end 82. However, other shapes and configurations are also possible. For example, protrusion 74 could include a square or rectangular form. In an alternative embodiment, recess 72 includes a plurality of openings in top wall 28 which releasably secure protrusions 74.

Filter pad 100 may be either reusable or disposable and manufactured from a variety of materials. In the preferred embodiment, filter pad 100 is provided with a first pair of pad sides 102 and a second pair of pad sides 104 essentially perpendicular to first pair pad sides 102. Filter pad 100 further includes an upstream side 106 and a downstream side 108. Filter pad 100 is removably secured in filter frame housing 12 by placing downstream side 108 of filter pad on planar surface upstream side 15 such that the first and second pair of pad sides 102, 104 are in alignment with the first and second pair of planar surface edges 18, 20. Filter pad 100 is initially constrained from movement parallel to planar surface 16 by inner wall 26. Filter pad 100 is constrained in the downstream direction by planar surface 16. Filter pad 100 is constrained in the upstream direction and further constrained parallel to planar surface 16 by engagement of retaining flanges 50a, 50b. In the preferred embodiment a plurality of velcro strips 110 are adhesively secured to inner wall 26. Velcro strips 110 further restrain filter pad 100. In the preferred embodiment a total of four velcro strips 110 three fourths of an inch in length are adhesively secured to inner wall 26, although various number and lengths of velcro strips 110 may be used.

In the preferred embodiment, first pair of retaining flanges 50a are rotated into engagement position about retaining hinge 36a such that bottom retaining channel wall 56 is placed adjacent to first channel 24 top wall 28. Protrusions 74 are releasably engaged in recesses 72. In this manner, side hinge wall 42 is essentially normal to planar surface 16. In this position, retaining extensions 62a extend partially over filter pad 100 parallel to planar surface 16.

Subsequently, second pair of retaining flanges 52b are rotated into engagement position about retaining hinge 36b such that bottom retaining channel wall 56 is placed adjacent to first channel 24 top wall 28. Protrusions 74 are releasably engaged in recesses 72. Retaining extensions 62b extend parallel to planar surface 16 overlapping first pair of retaining extensions 62a. Protrusions 74 and recesses 72 located in the overlapping retaining extensions 62a, 62b are also releasably engaged. In this engaged position, the filter frame housing 12 includes a cavity defined by planar surface 16 and retaining extensions 62 in the upstream and downstream directions, and by inner wall 26 of first channel 24 and inner retaining channel walls 54 of retaining channel 52 in the direction parallel to planar surface 16.

In this engaged position, filter frame housing 12 further includes a structural "T" beam border 90 including a first flange 92, a web 94, and a second flange 96. First flange 92 is defined by hinge 36, outer wall 30, and outer retaining channel wall 60. Web 94 is defined by top wall 28 and bottom retaining channel wall 56. Finally, second flange 96 is defined by inner wall 26 and inner retaining channel wall 54. This structural configuration provides filter frame housing 12 with enhanced strength characteristics. If filter frame housing 12 and filter pad 100 are placed in a forced air ventilation system backwards such that the upstream and downstream sides are reversed, velcro strips 110 aid to prevent filter pad 100 from being dislodged from filter frame housing.

Filter pad 100 is removed by disengaging fasteners 70 on second pair of retaining flanges 62b and rotating second pair of retaining flanges 62b about hinge 36b to the open position. Fasteners 70 on first pair of retaining flanges 62a are subsequently disengaged and second pair of retaining flanges 62a are rotated about hinge 38a to the open position. In this manner, filter pad 100 may be removed from the filter housing 12 and a new filter pad 100 may be advantageously replaced and secured as described above. Alternatively, filter pad 100 may be cleaned and replaced and secured as described above.

Frame housing 12 may be manufactured from a variety of materials including plastic, metal or cardboard. Filter Pad 100 may be manufactured from a variety of materials commonly known in the art, one material being polyester. In the preferred embodiment filter frame housing 12 is manufactured from a polyethylene trithilate glycol material, Kodar TM, Eastman Chemicals, product PETG6763. This material produces an electrostatic charge in filter frame housing 12 which is transmitted to filter pad 100 when it is engaged in filter frame housing 12. The electrostatic charge in filter pad 100 results in an increased filtering capability when air is forced through filter pad 100.

Although the invention has been described in conjunction with specific embodiments thereof, it is evident that alternatives, modifications and variations will be apparent to those skilled in the art. For example, the protrusions 74 in fasteners 70 could be integrally formed in bottom retaining channel wall 56 and recesses 72 integrally formed in top wall 28 of first channel 24. Frame housing 12 may be configured having a single flange, or more than one flange. Frame housing 12 may include a single hinge. It is intended that the claims embrace these and other alternatives, modifications and variations which fall within the spirit and scope of the appended claims.

I claim:

1. A one piece reusable filter frame housing for use in a forced air ventilating system, the filter frame housing releasably supporting a generally planar disposable filter media including a first side and a second side for filtering air which moves through the media from the first side to the second side, comprising:

a main member having a planar surface including a plurality of openings, the planar surface having an upstream face and a downstream face, a first pair of planar edges and a second pair of planar edges substantially perpendicular to the first pair of planar edges;

a retaining flange;

a hinge integrally formed between the retaining flange and main member to connect the retaining flange to the main member; and a fastener included on the flange, the fastener being releasably engageable with a portion of the filter frame housing to permit replacement of the filter media with a new filter media and restrict movement of the retaining flange and hold the new filter media between the upstream face and the retaining flange.

2. A one piece reusable filter frame housing for use in a forced air ventilating system, the filter frame housing releasably securing a disposable filter media comprising:

a main member having a planar surface including a plurality of openings, the planar surface having an upstream face and a downstream face, a first pair of planar edges and a second pair of planar edges substantially perpendicular to the first pair of planar edges;

a retaining flange;

a hinge integrally formed with the retaining flange and main members to connect the retaining flange to the main member;

an integrally formed fastener to releasably lock the filter media between the main member and the retaining flange; and wherein the main member is provided with a ridge integrally formed and extending from the first and second pair of planar edges.

3. The filter frame housing of claim 2 wherein the ridge is a first channel, the first channel having an inner wall and an outer wall normal to the planar surface, and a top wall parallel to the planar surface, the inner wall integrally formed and extending from the first and second pair of planar edges, the outer wall having a first pair of distal edges substantially parallel to the first pair of planar edges and a second pair of distal edges substantially parallel to the second pair of planar edges.

4. The filter frame housing of claim 3 further provided with a first pair of hinges integrally formed and extending from the first pair of distal edges, the first pair of hinges having a length equal to the length of the first pair of planar edges, the filter frame housing further provided with a second pair of hinges integrally formed and extending from the second pair of distal edges, the second pair of hinges having a length equal to the length of the second pair of distal edges.

5. The filter frame housing of claim 4 wherein each hinge is further provided with a lower hinge flange, a first hinge wall, a top hinge wall, a second hinge wall, and an upper hinge flange.

6. The filter frame housing of claim 4 further provided with a first pair of retaining flanges integrally formed and extending from the first pair of hinges, the filter frame housing further provided with a second pair of retaining flanges integrally formed and extending from the second pair of hinges, the first pair of retaining flanges having a length equal to the length of the first pair of hinges, the second pair of retaining flanges having a length equal to the length of the second pair of hinges.

7. The filter frame housing of claim 6 wherein each retaining flange is provided with a retaining channel and a retaining extension, the retaining channel having an inner retaining channel wall, a bottom retaining channel wall, and an outer retaining channel wall; the retaining extension integrally formed and extending from the inner retaining channel wall substantially parallel to the bottom retaining channel wall.

8. The filter frame housing of claim 7 wherein the fastener includes a plurality of recesses integrally formed in the top wall of the first channel receiving a plurality of protrusions integrally formed in the bottom retaining channel wall of the retaining channel.

9. The filter frame housing of claim 7 wherein the fastener includes a plurality of recesses integrally formed in the bottom wall of the retaining channel receiving a plurality of protrusions integrally formed in the top wall of the first channel.

10. The filter frame housing of claim 8 wherein the first pair of retaining extensions overlap the second pair of retaining extensions when the retaining flanges are releasably locked to the main member.

11. A reusable filter frame housing and filter useable in a forced air ventilating system comprising:

a filter media; and a one piece filter frame housing including a main member having a planar surface including a plurality of openings, the main member further having a first channel extending substantially normal to the planar surface, the filter frame housing further including a retaining flange having a retaining channel formed therein and a retaining extension extending from the retaining channel, an integrally formed hinge connecting the retaining flange to the main member, and the filter frame housing further including a first fastener integrally formed with the main member and a second fastener integrally formed with the retaining flange, the fasteners cooperating to releasably secure the filter media between the main member and the retaining flange, where the first channel, retaining channel and hinge form a structural "T" beam border when the filter frame housing is in the secured position.

12. The filter of claim 11 wherein the first channel has an inner wall and an outer wall normal to the planar surface, and a top wall parallel to the planar surface, the inner wall integrally formed and extending from a first and second pair of planar edges of the planar surface, the outer wall having a first pair of distal edges substantially parallel to the first pair of planar edges and a second pair of distal edges substantially parallel to the second pair of planar edges.

13. The filter of claim 12 wherein the integrally formed hinge includes a first pair of hinges integrally formed and extending from the first pair of distal edges, the first pair of hinges having a length equal to the length of the first pair of planar edges, wherein the integrally formed hinge further includes a second pair of hinges integrally formed and extending from the second pair of distal edges, the second pair of hinges having a length equal to the length of the second pair of distal edges.

14. The filter of claim 13 wherein each hinge of the first pair of hinges, and the second pair of hinges includes a lower hinge flange, a first hinge wall, a top hinge wall, a second hinge wall, and an upper hinge flange.

15. The filter of claim 13 wherein the retaining flange includes a first pair of retaining flanges integrally formed and extending from the first pair of hinges, and a second pair of retaining flanges integrally formed and extending from the second pair of hinges, the first pair of retaining flanges having a length equal to the length of the first pair of hinges, the second pair of retaining flanges having a length equal to the length of the second pair of hinges.

16. The filter of claim 15 wherein each retaining flange of the first pair of retaining flanges and the second pair of retaining flanges includes a separate retaining extension and a separate retaining channel, each separate retaining channel having a separate inner retaining channel wall, a separate bottom retaining channel wall, and a separate outer retaining channel wall; the separate retaining extensions are integrally formed and extending from the separate inner retaining channel walls substantially parallel to the separate bottom retaining channel walls.

17. The filter of claim 16 wherein the fastener includes a plurality of recesses integrally formed in the top wall of the first channel receiving a plurality of protrusions integrally formed in the bottom retaining channel wall of the retaining channel.

18. The filter of claim 16 wherein the fastener includes a plurality of recesses integrally formed in the bottom wall of the retaining channel receiving a plurality of protrusions integrally formed in the top wall of the first channel.

19. The filter of claim 17 wherein the first pair of retaining extensions overlap the second pair of retaining extensions when the retaining flanges are releasably locked to the main member.

20. A reusable filter frame housing and filter useable in a forced air ventilating system comprising: a filter media; and a one piece plastic filter frame housing including a main member having a planar surface including a plurality of openings formed therethrough, a retaining flange, an integrally formed hinge connecting the retaining flange to the main member, a first fastener integrally formed within the main member, and a second fastener integrally formed with the retaining flange, the fasteners cooperating to releasably secure the filter media between the main member and the retaining flange.

21. A reusable filter comprising:

a filter media; and a frame housing useable for supporting the filter media, the filter frame housing useable in a forced air ventilating system, the frame housing being manufactured from a polyethylene material and having an electrostatic charge which is transmitted to the filter media for increased filtering capability.

22. An air filter assembly for use in a forced air system where the air flows through the filter from an inlet side to an outlet side, the filter assembly comprising:

a filter pad;

a plastic, rectangular panel positioned at the outlet side of the filter pad, the panel including a plurality of openings;

a retaining flange disposed at each side of the rectangular panel wherein at least one flange is foldable to permit insertion and removal of the filter pad; and at least one fastener located on the flange to removeably fasten the flange to the rectangular panel, the filter pad being located between the flange and panel where the flange is attached to the panel.

23. The filter assembly of claim 22 wherein the openings are circular.

24. The filter assembly of claim 23 wherein the panel includes ribs extending between groups of the openings.

25. The filter assembly of claim 22 wherein the filter is captured between the panel and the at least one retaining flange.

26. The filter assembly of claim 22 wherein the at least one fastener is a tab on the at least one retaining flange and a corresponding recess on the panel.

27. A filter frame for use in a forced air system, the filter frame:
   a main member including a planar surface having planar edges, and a ridge integrally formed with the planar surface and extending from its planar edges; and
   a retaining flange attached to the main member, the retaining flange including a channel and an extension extending therefrom.

28. A filter frame for use in a forced air system, the filter frame:
   a main member including a planar surface having planar edges, and a first channel integrally formed with the planar surface and extending from its planar edges; and
   a retaining flange attached to the main member, the retaining flange including a retaining channel attached to the retaining flange and an extension extending from the retaining channel.

* * * * *